United States Patent
Koster

Patent Number: 5,116,172
Date of Patent: May 26, 1992

[54] COMPOSITE ROTARY CUTTING TOOL AND ADAPTOR AND METHOD OF MAKING SAME

[75] Inventor: Paul E. Koster, McHenry, Ill.

[73] Assignee: Precision Twist Drill Co., Crystal Lake, Ill.

[21] Appl. No.: 706,288

[22] Filed: May 28, 1991

[51] Int. Cl.$^5$ .................. B23B 51/02; B23P 15/32
[52] U.S. Cl. .................. 408/226; 76/108.6; 76/115; 156/257; 156/294; 407/118
[58] Field of Search .................. 408/226, 238, 239 R; 407/118; 156/153, 257, 293, 294; 76/108.1, 108.6, 115; 144/353

[56] References Cited

U.S. PATENT DOCUMENTS

| | | | |
|---|---|---|---|
| 3,751,176 | 8/1973 | Von Hollen | 407/118 X |
| 4,051,905 | 10/1977 | Kleine | 279/19.3 X |
| 4,445,810 | 5/1984 | Theilen | 407/118 |
| 4,679,917 | 7/1987 | Maier | 408/145 |
| 4,873,895 | 10/1989 | Taylor et al. | 76/108 A |
| 5,074,025 | 12/1991 | Willard, III | 408/226 X |

*Primary Examiner*—Steven C. Bishop
*Attorney, Agent, or Firm*—Welsh & Katz, Ltd.

[57] ABSTRACT

A composite rotary cutting tool and adaptor includes a straight cutting tool, such as a drill bit or the like, having a cylindrical shank adhesively bonded within a close fitting axial bore in an adaptor or gripping member which has an outer circumferential gripping surface larger than the cutting tool shank. The cutting tool shank has at least one helical channel or groove formed therein so as to maintain a substantial portion of the original cylindrical surface area. The adaptor is hardened in a manner to prevent scale formation in the bore, and an anaerobic adhesive is applied within the bore and along the shank and into the helical groove. The shank is inserted into the adaptor bore to effect full wetting between the interfacing surfaces. The assembly is then fixtured in a vertical orientation and heat cured so as to obtain a composite cutting tool and adaptor having high torque and low concentricity run-out and angularity error.

32 Claims, 1 Drawing Sheet

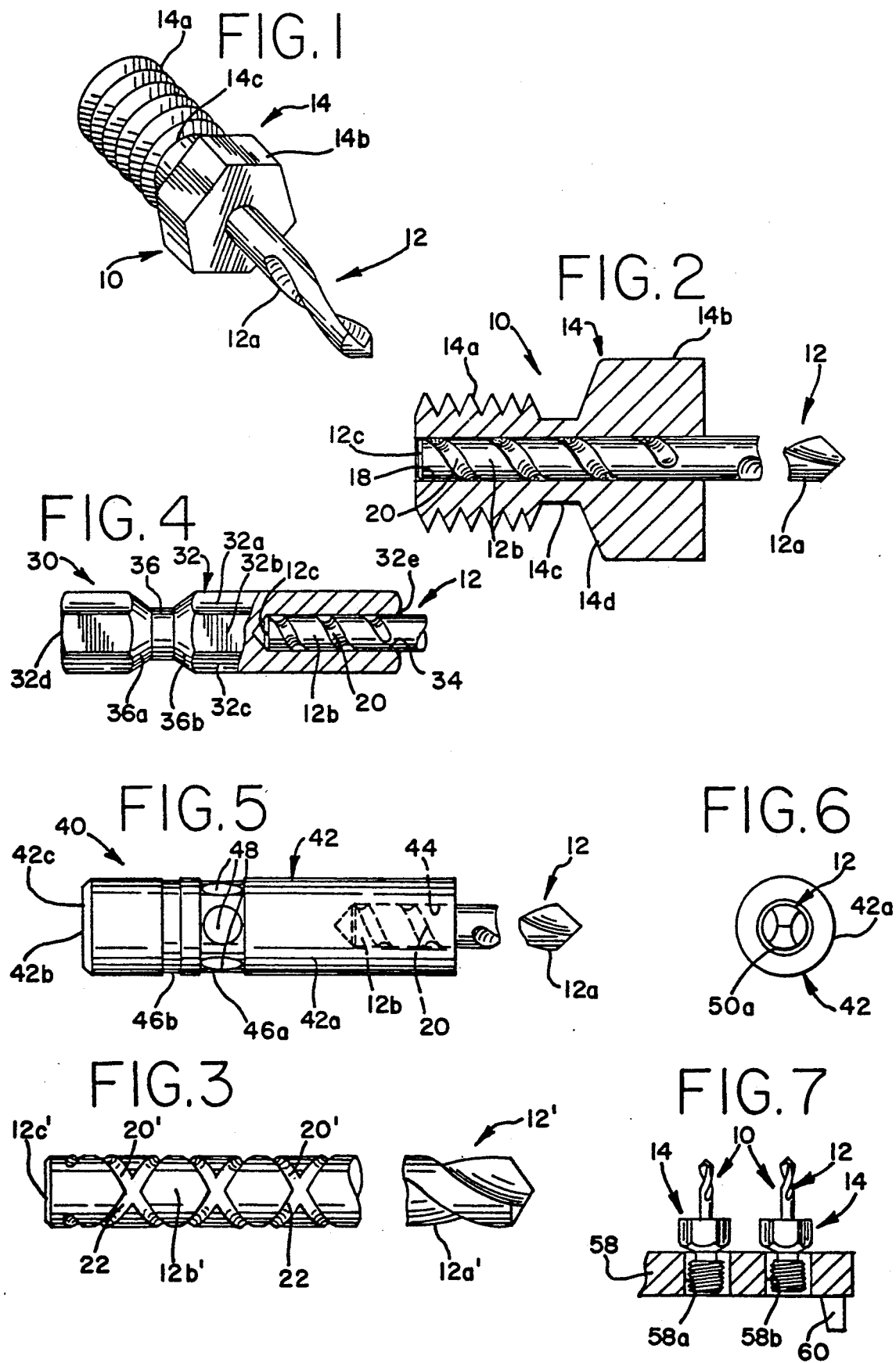

COMPOSITE ROTARY CUTTING TOOL AND ADAPTOR AND METHOD OF MAKING SAME

BACKGROUND OF THE INVENTION

The present invention relates generally to rotary cutting tools, such as used in drilling, reaming, grinding and burnishing and the like, and more particularly to a novel composite rotary cutting tool and adaptor and method of making same.

It is known in the tool industry to mount a rotatable cutting tool, such as a high speed twist drill, in an adaptor or gripping member so as to form a composite cutting tool. The metal cutting end of the composite tool may comprise a conventional drill bit having a fluted cutting end and a shank end, and having the desired harness and rigidity. The shank end is generally secured, as by welding, brazing or an adhesive, within an axial bore in an adaptor or gripping member having a larger outer diameter than the drill. See, for example U.S. Pat. Nos. 3,751,176, 4,445,810 and 4,679,971.

Composite drill bits of the aforedescribed type offer a number of advantages. A primary advantage particularly related to small diameter drills, such as in the order of 5 mm or smaller, is that the adaptor or gripping member facilitates mounting of the small diameter drill bit in a conventional chuck of a handheld tool or floor-mounted machine tool, whereas a small diameter drill shank without an adaptor might slip into the space between two jaws or otherwise result in a non-concentric mounting. The larger diameter adaptor or gripping member may be made of a softer material than the associated metal cutting end of the tool, thus minimizing wear and damage to the chuck jaws. The gripping member may also contribute to removal of heat from the metal cutting end of the tool caused by friction during a cutting operation.

A significant problem with known composite metal cutting tools lies in the manner of retaining the shank of the metal cutting tool, such as a high speed twist drill, burr, polishing bit or grinding bit, within the corresponding adaptor or gripping member. As disclosed in U.S. Pat. No. 3,751,176 to Von Hollen, welding or brazing the shank of a metal cutting tool to a larger diameter gripping or adaptor member may soften the cutting end so as to substantially reduce the working life of the tool. The composite bit disclosed in the Von hollen patent represents an attempt to overcome the problems inherent in welding or brazing a cutting tool to a larger diameter gripping or adaptor member, by adhesively bonding the cutting tool shank within an axial bore in the gripping member. Von Hollen teaches that the desired bond strength between the cutting tool shank and the gripping member bore may be obtained by making the length of the interengaging surfaces exceed the minimum length required to produce the desired bond strength for a particular set of surface conditions and clearance between the interengaging surfaces. Von Hollen suggests that the maximum strength or load carrying capacity of the adhesive bond may be increased by etching or abrading the interengaging surfaces so as to roughen these surfaces.

A drawback in the various embodiments of composite bits disclosed in the Von Hollen patent is that desired torque resistant adhesive bonding cannot be achieved together with low concentricity run-out and low angularity error on a consistent and economical basis. The present invention addresses these problems by providing a composite cutting tool and adaptor, and method of making the same, wherein the shank of a cutting tool is adhesively secured within an axial bore of an adaptor in a manner to achieve improved torque resistant bonding together with low concentricity run-out and low angularity error.

SUMMARY OF THE INVENTION

In carrying out the present invention, a composite rotary cutting tool and adaptor is provided wherein the shank portion of a straight cutting tool, such as a drill, reamer, grinding bit or burnishing bit or the like, is adhesively fixed within an axial bore in an adaptor or gripping member having a larger outer circumferential gripping surface than the cutting tool shank. In a preferred embodiment, the cutting tool has a cylindrical shank along which at least one helical or spiral channel or groove is formed so as to maintain a substantial portion of the original cylindrical surface area. The shank and bore are sized to provide a very small clearance therebetween. The adaptor is hardened in a manner to prevent scale formation in the bore, or is otherwise descaled. An anaerobic adhesive is applied to the bore of the adaptor and along the shank of the cutting tool so as to coat the cylindrical surface area and fill the helical groove. The shank is then inserted into the adaptor bore so as to effect full wetting of the interengaging surfaces. The assembly is then fixtured in a vertical orientation and heat cured so as to obtain a composite cutting tool and adaptor having low concentricity run-out and low angularity error.

Accordingly, one of the primary objects of the present invention is to provide a novel composite cutting tool and adaptor, and method of making the same, which has substantially reduced concentricity run-out and angularity error than heretofore obtained with prior composite cutting tools and adaptors.

A more particular object of the present invention is to provide a novel composite cutting tool and adaptor wherein the adaptor body is hardened to a predetermined specification and has an axial bore free of scale. The shank end of the cutting tool and axial bore are formed to provide small clearance or a light press fit therebetween, and the shank has at least one helical groove or channel formed therein to receive and insure wetting of an anaerobic adhesive between interfacing surfaces of the shank and bore when in assembled relation.

A feature of one embodiment of the composite cutting tool and adaptor in accordance with the present invention lies in the provision of opposing spiral grooves formed in the shank end of the cutting tool so as to increase the volume of bonding adhesive while retaining substantial surface area of the original shank diameter to thereby provide improved support and alignment stability between the shank and adaptor.

Further objects, features and advantages of the present invention, together with the organization and manner of operation thereof, will become apparent from the following detailed description of the invention when taken in conjunction with the accompanying drawing wherein like reference numerals designate like elements throughout the several views.

BRIEF DESCRIPTION OF THE DRAWING

FIG. 1 is a perspective view, on an enlarged scale, of a composite cutting tool and adaptor constructed in accordance with one embodiment of the present invention;

FIG. 2 is a longitudinal sectional view of the composite cutting tool and adaptor illustrated in FIG. 1;

FIG. 3 is an elevational view, on an enlarged scale, of an alternative cutting tool which may be employed in the composite cutting tool and adaptor embodiments of FIGS. 2 and 4-6 and which has opposing spiral grooves formed along the shank for insertion within an adaptor bore;

FIG. 4 is an elevational view, on an enlarged scale and partially broken away, of a composite cutting tool and adaptor in accordance with another embodiment of the present invention;

FIG. 5 is an elevational view, on an enlarged scale, of another embodiment of a composite cutting tool and adaptor in accordance with the present invention;

FIG. 6 is an end view of the composite cutting tool and adaptor illustrated in FIG. 5; and FIG. 7 is a fragmentary vertical sectional view illustrating a support fixture for supporting a plurality of assembled cutting tools and associated adaptors in substantially vertical relation within a heating furnace during curing.

DETAILED DESCRIPTION

Referring now to the drawing, and in particular to FIGS. 1 and 2, a composite cutting tool and adaptor constructed in accordance with one embodiment of the present invention is indicated generally at 10. The composite cutting tool and adaptor 10 includes a cutting tool 12 and an adaptor or gripping member 14. In the illustrated embodiment, the cutting tool 12 comprises a metal cutting drill bit having a conventional fluted cutting end 12a and a cylindrical shank portion 12b having a diameter substantially equal to the nominal diameter of the cutting end of the drill bit. It will be understood that the drill bit 12 may alternatively comprise a reamer, a grinding or burnishing bit, or a similar type tool adapted for finishing or cutting metal when used with a hand-held rotary tool or other type of machine tool where relatively precision work is required.

The adaptor or gripping member 14 is made of a metallic material and may take any one of a number of different design styles depending on its intended use. In the embodiment illustrated in FIGS. 1 and 2, the adaptor 14 has an externally threaded end 14a facilitating threaded mounting of the adaptor in the tapped bore of a rotatable support chuck which, in turn, may be mounted on a hand-held drill or the like. An outer circumferential gripping surface, such as a hexagonal shaped surface 14b, is formed on the forward end of the adaptor and defines wrenching flats separated from the threaded end 14a by a circumferential undercut 14c. A frustoconical surface 14d is formed between the undercut 14c and the hexagonal surface 14b and may serve to seat against a complimentary surface on the rotatable chuck in which the adaptor is mounted during a cutting operation.

The adaptor 14 has an axial cylindrical bore 18 formed through its full longitudinal length. The bore 18 is drilled and reamed to a predetermined close tolerance diameter so as to provide a close clearance fit with the shank end 12b of the cutting tool 12 during assembly. Preferably, the adaptor 14, as well as alternative adaptor designs to be hereinafter described, have their longitudinal bores sized for receiving popular size drills so as to provide a predetermined clearance therewith when the shank of the drill is inserted into the adaptor bore.

In the illustrated embodiment, the drill cutting tool 12 is manufactured through conventional manufacturing techniques with the exception of the portion of the shank 12b which is to be bonded within the axial bore 18 in the adaptor 14. The drill shank area 12b is finished to a diameter having a clearance of approximately 0.0006-0.0009 inch with the finished bore 18 in adaptor 14. After the shank 12b of drill 12 is sized to provide the desired clearance with the adaptor bore 18, at least one helical or spiral groove or channel, such as indicated at 20 in FIG. 2, is formed along the shank 12b a distance from its free end slightly less than the length of the shank which will be received within the adaptor bore 18. The spiral groove 20 may have a rounded or radial base surface or may be formed as a helical channel having a generally rectangular transverse cross-sectional configuration.

As will become apparent, the helical groove or channel 20 formed in the drill shank 12b provides a reservoir for adhesive to accumulate for assuring wetting of the interfacing surfaces of the shank and adaptor bore 18 during assembly. Further the helical groove or channel 20 increases the surface area of the drill shank contacted by the adhesive and thereby increases the adhesive bonding and torque holding power between the drill shank and the adaptor bore 18 when in assembled relation. By forming a spiral groove or channel 20 along the length of the drill shank to be received within the adaptor bore 18, a substantial portion of the finished cylindrical surface of the shank is maintained which provides a pilot surface with the adaptor bore and improves support and stability with resulting improved concentricity alignment between the axis of the drill and the longitudinal axis of the adaptor 14. The configuration of the spiral groove 20, such as its cross-sectional area and angular pitch relative to the longitudinal axis of the shank 12b, are preferably selected to maintain approximately 30%-50% of the original cylindrical surface of the shank for engagement with the peripheral wall of the adaptor bore 18 when the shank is inserted into the bore.

The shank 12b of the drill 12 is adhesively bonded within the adaptor bore 18 by an anaerobic adhesive. The anaerobic adhesive may be characterized as being active in the absence of free oxygen, and is also active in the presence of the metal ions. The materials selected for the drill bit 12 and the adaptor 14 are preferably of the type having metal ions which react with the anaerobic adhesive. An example of an anaerobic adhesive which has been found particularly suitable in carrying out the present invention is commercially available from Henkel Corporation, Minneapolis, MN, under its product designation OMNIFIT 1750. This adhesive is characterized as having good wetting and gap filling properties and is particularly suitable for filling gaps or clearances up to 0.006 inch between the cutting tool shank and the corresponding adaptor bore. It is preferred, however, that the clearance between the outer cylindrical surface area of the drill shank 12b and the adaptor bore 18 be maintained at approximately 0.0006-0.0009 inch. The adhesive is applied to the wall of the adaptor bore 18 and along the periphery of the drill shank 12b which is then inserted into the adaptor bore and preferably rotated approximately 360° to effect full wetting between the interfacing surfaces of the drill shank and adaptor bore.

FIG. 3 illustrates an alternative cutting tool in the form of a metal cutting drill 12, having a fluted cutting end 12′a and a shank end 12′b. The shank end 12′b has an outer cylindrical surface of a diameter substantially equal to the diameter of the shank end 12b of drill 12 and is adapted to be mounted within the prepared bore 14 in the adaptor 18 with substantially the same clearance as desired between bore 14 and shank end 12b, namely, 0.0006–0.0009 inch. The shank end 12′b has a pair of opposing helical or spiral grooves or channels 20, and 22 formed therein which extend along a length of the shank 12′b from its free end a distance slightly less than the length of the shank which will be received within the bore of an adaptor. The grooves or channels 20′ and 22 preferably have substantially equal but opposite spiral angularity relative to the longitudinal axis of the shank 12b, and have radial base surfaces or are of generally rectangular transverse cross-section, such as the aforedescribed helical groove 20. The cross-pattern helical grooves 20′ and 22 are formed so that a substantial portion of the original diameter or cylindrical surface of the shank 12′b is maintained, preferably 30%–50% of the cylindrical shank surface, to engage the wall of an adaptor bore and provide stable support and concentric alignment between the drill shank and the associated adaptor. It will be understood that maintaining less than 30% of the shank cylindrical surface may also provide desired concentricity with the adaptor bore where the shank and adaptor bore are formed to establish relatively small clearance therebetween.

By providing a pair of opposing spiral grooves or channels 20′ and 22 in the shank 12′b of drill tool 12′, greater contact area for the bonding adhesive is provided over a single spiral groove or channel with the result that higher torque resistance is created for the composite cutting tool and adaptor. A pattern of opposing spiral grooves or channels also serves to accumulate a greater volume of adhesive to effect wetting between the interengaging surfaces when the shank 12′b is inserted into the bore of an adaptor having relatively small clearance with the shank, such as in the order or 0.0006–0.0009 inch. The pattern of opposing spiral grooves 20′ and 22 also reduces the possibility of wiping the adhesive from the outer peripheral surface of the drill shank during assembly. The cutting tools 12 and 12′ are made of a suitable high speed steel and each has a chamfer formed at the free end of its shank, such as indicated at 12c and 12′c, to facilitate entry of the shank into the axial bore of an adaptor. Alternatively, the cutting tools 12 and 12′ may be made of solid carbide.

FIGS. 4–6 illustrate alternative adaptors for use with cutting tools, such as the aforedescribed drill bits 12 and 12′. Referring the FIG. 4, a composite cutting tool and adaptor in accordance with one alternative embodiment is indicated generally at 30. The composite cutting tool and adaptor 30 includes a cutting tool 12, only the shank portion 12b of which is illustrated, and an adaptor 32 having a blind axial bore 34 which is drilled and reamed to provide relatively small clearance with the cutting tool shank end 12b, such as approximately 0.0006–0.0009 inch clearance.

The adaptor 32 has an outer peripheral gripping surface in the form of a hexagonal surface defining geometrically opposed flats, three of which are illustrated at 32a, 32b and 32c. The flats or gripping surfaces of adaptor 32 are interrupted along their lengths by a cylindrical undercut surface 36. Annular surfaces 36a and 36b, each of which may be defined as a segment of a torus, are formed on opposite sides of the under 36. The annular undercut 36 and adjacent annular surfaces 36a and 36b provide a means for securing the adaptor 32 longitudinally within a rotatable chuck on a hand drill or other machine tool. If desired, the hexagonal gripping surface on adaptor 32 may extend along the full length of the adaptor without the undercut 36.

The shank 12b of cutting tool 12 has a helical or spiral groove or channel 20 and is adhesively bonded within the bore 34 by an anaerobic adhesive in similar fashion to adhesive bonding of the cutting tool shank 12b in the bore 18 of adaptor 14 as illustrated in FIG. 2. The anaerobic adhesive is similarly applied to the annular wall of the bore 34 and to the shank end 12b so as to cover the full periphery of the shank, including filling of the spiral groove or channel 20. The shank end of the cutting tool is then inserted into the bore 34 and preferably rotated approximately 360 to effect full wetting of the adhesive to the interfacing surfaces of the cutting tool shank and the bore. The bore 34 is drilled and reamed to a depth sufficient to receive a predetermined length of the cutting tool shank 12b so as to provide a desired torque rating when the shank is adhesively fixed within the bore 34. Preferably, the adaptor 32 has a lead-in chamfer 32e formed circumferentially about the entry end of bore 34 to facilitate entry of the shank end of the cutting tool.

FIGS. 5 and 6 illustrate another embodiment of a composite cutting tool and adaptor, indicated generally at 40, constructed in accordance with the present invention. The composite cutting tool and adaptor 40 includes a cutting tool 12 and an adaptor 42. The adaptor 42, which may be termed a quick change adaptor, has an outer cylindrical surface 42a and an axial cylindrical bore 44 which is drilled and reamed to a diameter providing a close clearance fit with the cylindrical cutting tool shank 12b, such as approximately 0.0006–0.0009 inch clearance. The outer cylindrical surface 42a of the adaptor 42 is interrupted by a pair of concentric annular undercuts 46a and 46b which are of equal diameter but have different longitudinal lengths. The annular undercut 46a has a plurality of circumferentially equidistantly spaced blind cylindrical bores 48 formed radially therein such that the axes of the blind bores lie in a common plane transverse to the longitudinal axis of bore 44 and spaced a predetermined distance from the free end 42b of the adaptor. The blind bores 48 provide means for releasibly mounting the adaptor 42 within a chuck or the like of a hand-held drill or other machine tool and effecting positive driven rotation of the cutting tool. An annular chamfer 42c is preferably formed at the free end 42b of adaptor 42. The forward or leading end of the adaptor 42 also has an annular chamfer 42d to facilitate entry of the cutting tool shank 12b into the adaptor bore 44.

In one embodiment of the composite cutting tool and adaptor 40, the shank end 12b of the cutting tool 12 is adhesively bonded within the axial bore 44 of adaptor 42 in similar fashion to adhesive bonding of a cutting tool 12 within the axial bore in either of the adaptors 14 and 32. An anaerobic adhesive is applied to the peripheral surface of bore 44 and along the peripheral surface of the cylindrical shank end of cutting tool 12 and within the spiral groove or channel 20 so as to effect full wetting of the anaerobic adhesive between the interfacing surfaces of the cutting tool and adaptor bore when the shank is inserted into the bore and rotated 360° during insertion. The adaptors 32 and 42 and associated cutting tools 12 are supported in vertical relation on a suitable support fixture during curing and hardening of the anaerobic adhesive, in similar fashion to support and curing of the composite cutting tool and adaptor 10.

In an alternative embodiment of the composite cutting tool and adaptor 40, the bore 44 of adaptor 42 and the shank 12b of cutting tool 12 may be sized to establish a press fit in the form of an interference fit of approximately 0.0015 inch between the shank and bore. An anaerobic adhesive is applied to the bore 44 and along the periphery of the tool shank 12b, including within the spiral groove 20, followed by pressing the shank within the bore to obtain full wetting of adhesive between the bore and shank surfaces. By maintaining approximately 30%-50% of the original cylindrical surface of the shank 12d after forming of the spiral groove or channel 20, excellent concentricity is obtained between the axes of the bore 44 and tool shank. Such a combination press fit and anaerobic adhesive between the adaptor bore and cutting tool shank may be particularly desirable where the cutting tool has a diameter greater than one-quarter inch and a relatively high torque rating between the shank and adaptor, such as approximately 120 ft. lbs., is required.

The adaptors 14, 32 and 42 are made of a suitable metallic material, such as 4130 alloy steel having a hardness of at least 25Rc, and preferably a hardness of approximately 44-50Rc. Alternatively, the adaptor 32, for example, may be made of a lower cost softer material where the composite cutting tool and adaptor 30 are intended for use by the hobbyist or for noncommercial use. In heat treating the adaptors to obtain the desired hardness, it is important that any scale that may be formed on the wall of the corresponding axial bore be removed prior to assembly with the shank of a cutting tool so as to insure maximum bonding strength. In a preferred embodiment, the adaptors are vacuum hardened in a manner such that no scale is formed on the exposed surface of the adaptors, including their axial bores. The adaptors may then subjected to a steam oxide treatment to obtain a preferred black finish which facilitates marking on the external surface of the adaptor, such as by laser marking. Alternatively, the adaptors may be hardened by heating in a furnace and oil quenching, with any scale formed within the bores of the adaptors being removed in a known manner.

In the method of manufacturing the composite cutting tools and adaptors in accordance with the present invention, the separate cutting tools and adaptors are first washed to remove any oil and grease from their surfaces. This is done after any scale is removed from the axial bores of the adaptors. The cleaning process may be carried out in a conventional degreaser having, for example, means to create a vapor of trichloroethylene.

After removing any scale, grease and oil from the cutting tools and adaptors, the anaerobic adhesive is applied to the shank end of each cutting tool and to the annular wall of the corresponding adaptor bore through a suitable applicator, such as a plastic applicator which is compatible with anaerobic adhesives. After applying adhesive along the shank of a cutting tool in a manner to deposit adhesive within the corresponding spiral groove or channel, the shank of the cutting tool is inserted into the adhesive coated bore of the adaptor, preferably with a simultaneous twisting or rotational motion of approximately 360°, until the shank end reaches the rear end of the bore, as in the adaptor 14, or seats against the bottom of the bore, as in the adaptors 32 and 42 having blind axial bores. To facilitate removal of any excess adhesive that may be deposited on the outer surface of the adaptor such as on the external thread 14a on adaptor 14, or accumulate at the entry end of the adaptor bore, or at the exit end of an adaptor bore which extends fully through the adaptor, the assembled adaptor and cutting tool are preferably washed in a cold trichloroethylene bath. In applications where a small bead of hardened adhesive around the shank 12b at its entry into the bore in the associated adaptor, such as bore 18 in adaptor 14, is permissible, excess adhesive may be wiped from the assembly, and cold washing with trichloroethylene eliminated.

After assembling a cutting tool shank within the axial bore of an adaptor, the assembled tool and adaptor is placed in a vertical orientation in a horizontal support fixture, such as indicated at 58 in FIG. 7. The support fixture 58 has a plurality of openings, two of which are indicated at 58a and 58b, of suitable configurations so that each opening receives an adaptor in supporting relation with the axis of the adaptor and corresponding cutting tool in a substantially vertical orientation. This position allows the adhesive to flow uniformly about the periphery of the shank surface and assures full surface wetting of the adhesive between the periphery of each cutting tool shank and the peripheral wall of the corresponding adaptor bore. The support fixture 58 is adapted to support a substantial number of assembled adaptors and cutting tools after which the fixture may be placed within a furnace or oven for curing of the adhesive. Preferably the support fixture 58 has a plurality of support legs, one of which is indicated at 60, extending downwardly from its lower surface to facilitate uniform heat flow about the fixture and curing of the adhesively secured adaptors and cutting tools. The support fixture plate 58 is preferably made of a metallic material which prevents rapid cooling of the adhesive.

Curing of the anaerobic adhesive bonding the shanks of the cuttings tools to the associated adaptors is preferably carried out by placing the support fixture plate 58 and supported composite cutting tool assemblies in an oven or furnace heated to a temperature of approximately 250° F. for approximately one hour. Preferably, the heating furnace or oven is preheated to approximately 250° F. for a period of approximately fifteen minutes before inserting the assembled cutting tools and adaptors for curing.

Following heat curing of the anaerobic adhesive bonding each cutting tool within its associated adaptor, the support fixture plate 58 is removed from the curing oven and allowed to cool. Preferably, the support plate and supported composite cutting tools and adaptors are then placed in a degreaser having means to spray or wash the composite cutting tools and adaptors with hot liquid trichloroethylene to remove any excess adhesive. Depending on the ultimate application or use of the composite cutting tool and adaptor, hot washing after furnace curing of the adhesive may not be necessary.

Having thus described various embodiments of composite cutting tools and adaptors in accordance with the present invention, and a preferred method of making such composite cutting tools and adaptors, it will be understood that by forming one or more spiral grooves or channels along the length of a cutting tool shank end as described, a substantial portion of the original outer cylindrical surface of the shank, such as approximately 30%-50%, is maintained for assuring accurate and con- centric mounting of the cutting tool within an adaptor bore. This also assures substantially reduced angularity error between the axis of the cutting tool and the longitudinal axis of the corresponding adaptor. The spiral grooves also receive sufficient anaerobic adhesive to assure full wetting of adhesive between the interfacing surfaces of the cutting tools and adaptor bores, as well as providing improved torque resistance after curing of the adhesive.

While preferred embodiments of the present invention have been illustrated and described, it will be understood that changes and modifications may be made therein without departing from the invention in its broader aspects. Various features of the invention are defined in the following claims.

What is claimed is:

1. A composite cutting tool and adaptor for precision cutting metallic parts, said tool and adaptor comprising a metallic cutting tool having a cutting end and a generally cylindrical shank end, and an adaptor having a metallic body defining an external gripping surface and having an axial bore free from scale, said shank end of said cutting tool being disposed within said bore and establishing relatively small clearance peripherally of said shank end, said shank end having at least one spiral groove along a predetermined length thereof, and an anaerobic adhesive between the interfacing surfaces of said shank and the peripheral wall of said bore and filling said groove, said adhesive being cured to a hardened state so as to lock said shank end within said adaptor, said metallic cutting tool shank and said metallic body of said adaptor having metal ions which react with said anaerobic adhesive.

2. A composite cutting tool and adaptor as defined in claim 1 wherein said axial bore is formed to provide a clearance in the range of approximately 0.0006-0.0009 inch between said bore and cylindrical shank end.

3. A composite cutting tool and adaptor as defined in claim 1 wherein said spiral groove extends along said shank end a distance less than the length of said shank disposed within said axial bore in said adaptor.

4. A composite cutting tool and adaptor as defined in claim 1 wherein said shank end has a plurality of spiral grooves formed therein along said predetermined length.

5. A composite cutting tool and adaptor as defined in claim 4 wherein said shank end has two opposing spiral grooves formed along said predetermined length thereof.

6. A composite cutting tool and adaptor as defined in claim 5 wherein said adhesive is disposed within said opposing spiral grooves and between the interfacing surfaces of said shank end and said axial bore.

7. A composite cutting tool and adaptor as defined in claim 1 wherein said spiral groove is formed so that approximately 30%-50% of the cylindrical shank end surface is maintained for engaging the peripheral wall of said bore.

8. A composite cutting tool and adaptor as defined in claim 1 wherein said adaptor has an external thread axially spaced from said gripping surface.

9. A composite cutting tool and adaptor as defined in claim 1 wherein said gripping surface is defined by a hexagonal surface.

10. A composite cutting tool and adaptor as defined in claim 1 wherein said axial bore extends fully through the length of said adaptor.

11. A method of making a composite cutting tool and adaptor for precision cutting metallic material wherein the cutting tool is made of metallic material and has a cutting end and a generally cylindrical shank end, and wherein the adaptor has a metallic body having an external gripping surface and an axial cylindrical bore, said method comprising the steps of;

forming said axial bore in said adaptor tool to a predetermined diameter having a relatively narrow tolerance range, forming said shank end of said cutting tool to a diameter which will provide a relatively small clearance peripherally of said shank end when inserted in said axial bore, forming at least one spiral groove along a predetermined length of said shank end of said cutting tool so as to retain a substantial portion of the outer cylindrical shank surface undisturbed, applying an anaerobic adhesive to said shank end of said cutting tool so as to cover said undisturbed cylindrical surface and fill said spiral groove, inserting said shank end into said bore so that said adhesive wets the mutually interfacing surfaces of said shank end and said bore, and curing said adhesive to a hardened state so as to lock said shank end within said adaptor.

12. The method of claim 11 including the step of removing any excess adhesive accumulated on the exposed cutting tool and external adaptor surfaces with a cold adhesive solvent before curing of said adhesive.

13. The method of claim 12 wherein said step of removing excess adhesive comprises spraying the composite cutting tool and adaptor with said solvent before curing of said adhesive.

14. The method of claim 11 including the step of hardening said adaptor to a minimum hardness of approximately 25Rc.

15. The method of claim 11 wherein said step of curing said adhesive comprises heating the assembled cutting tool and adaptor in a heating chamber at a temperature of approximately 250° F. for a period of approximately one hour.

16. The method of claim 11 wherein said step of curing said adhesive includes positioning the assembled shank and adaptor so that the longitudinal axis of the assembled shank and bore is substantially vertical during curing.

17. The method of claim 11 wherein said step of forming said at least one spiral groove comprises maintaining approximately 30%-50% of the cylindrical surface of said shank end for engaging the periphery of said axial bore.

18. The method of claim 11 including the step of forming at least a portion of said external gripping surface so as to define a hexagonal surface.

19. The method of claim 11 wherein said bore extends the full length of said adaptor.

20. The method of claim 11 wherein said bore is formed to provide a clearance in the range of approximately 0.0006-0.0009 inch between said bore and said uninterrupted shank end surface.

21. The method of claim 11 wherein said spiral groove is formed in said shank end so as to extend from a terminal end thereof a distance less than the length of said shank inserted into said axial bore in said adaptor.

22. The method of claim 11 including the step of removing all oil and grease from at least said axial bore and said shank end of said cutting tool prior to applying said anaerobic adhesive.

23. The method of claim 11 including the step of applying anaerobic adhesive to the annular wall of said cylindrical bore prior to inserting said shank end into said bore.

24. The method of claim 23 including the step of rotating said shank end about its longitudinal axis approximately 360° simultaneously with inserting said shank end into said bore.

25. The method of claim 11 including the step of washing the composite cutting tool and adaptor with a hot solvent after curing of said adhesive.

26. The method of claim 25 wherein said hot solvent comprises hot trichlorethylene.

27. A composite cutting tool and adaptor for precision cutting metallic parts comprising a metallic cutting tool having a cutting end and a generally cylindrical shank end, and an adaptor having a metallic body defining an external gripping surface and having an axial bore free from scale, said shank end having at least one spiral groove along a predetermined length thereof, said shank end of said cutting tool being disposed within said bore with an interference press fit therebetween, and an anaerobic adhesive between the interfacing surfaces of said shank and the peripheral wall of said bore and filling said groove, said adhesive being cured to a hardened state so as to lock the shank end within the adaptor.

28. A composite cutting tool and adaptor as defined in claim 27 wherein said axial bore is formed to provide an interference fit with said shank end of approximately 0.0015 inch.

29. A composite cutting tool and adaptor as defined in claim 28 wherein said spiral groove extends along said shank end a distance less than the length of said shank disposed within said axial bore in said adaptor.

30. A composite cutting tool and adaptor as defined in claim 29 wherein said shank end has a plurality of spiral grooves formed therein along said predetermined length.

31. A composite cutting tool and adaptor as defined in claim 30 wherein said shank end has two opposing spiral grooves formed along said predetermined length thereof.

32. A composite cutting tool and adaptor as defined in claim 27 wherein said spiral groove is formed so as to maintain at least approximately 30% of the cylindrical surface of said shank end for engaging the peripheral surface said axial bore.

* * * * *